(12) United States Patent
Lin et al.

(10) Patent No.: US 12,063,589 B2
(45) Date of Patent: *Aug. 13, 2024

(54) ADAPTIVE BEACON REPORT FOR CLIENT DEVICES

(71) Applicant: Cisco Technology, Inc., San Jose, CA (US)

(72) Inventors: Ta Chien Lin, San Jose, CA (US); Vishal Satyendra Desai, San Jose, CA (US); Yong Seok Joo, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,420

(22) Filed: Jun. 2, 2023

(65) Prior Publication Data

US 2023/0319693 A1    Oct. 5, 2023

Related U.S. Application Data

(63) Continuation of application No. 17/167,733, filed on Feb. 4, 2021, now Pat. No. 11,696,221.

(51) Int. Cl.
| | |
|---|---|
| *H04W 48/16* | (2009.01) |
| *H04B 17/318* | (2015.01) |
| *H04W 24/10* | (2009.01) |
| *H04W 36/00* | (2009.01) |
| *H04W 48/12* | (2009.01) |
| *H04W 88/08* | (2009.01) |

(52) U.S. Cl.
CPC .......... *H04W 48/16* (2013.01); *H04B 17/318* (2015.01); *H04W 24/10* (2013.01); *H04W 36/00837* (2018.08); *H04W 48/12* (2013.01); *H04W 88/08* (2013.01)

(58) Field of Classification Search
CPC ................ H04W 48/16; H04W 24/10; H04W 36/00837; H04W 48/12; H04W 88/08; H04W 36/0085; H04W 84/12; H04B 17/318
USPC ................................ 370/338; 455/432.1–445
See application file for complete search history.

(56) References Cited

U.S. PATENT DOCUMENTS

| | | | |
|---|---|---|---|
| 2006/0087474 A1 | 4/2006 | Do et al. | |
| 2007/0015511 A1* | 1/2007 | Kwun ................. | H04W 36/302 455/436 |
| 2012/0149428 A1* | 6/2012 | Yang ................. | H04W 56/0045 455/524 |
| 2015/0089044 A1 | 3/2015 | Atreya et al. | |
| 2015/0098392 A1 | 4/2015 | Homchaudhuri et al. | |

(Continued)

OTHER PUBLICATIONS

Allen Huotari, Why the 802.11k and Neighbor Report are Important?, Cisco Blogs, Apr. 13, 2015, 9 pages.

(Continued)

*Primary Examiner* — Michael Y Mapa
(74) *Attorney, Agent, or Firm* — Merchant & Gould P.C.

(57) ABSTRACT

Network side beacon reports (NSBRs) may be generated based on probe signals received from one or more client devices (CDs) in a wireless network. Once enabled, an NSBR mode is configured to generate NSBRs remotely from a CD. When in the NSBR mode, an NSBR may be generated based on compiled probe signal parameters associated with one or more probe signals received from the CD.

20 Claims, 4 Drawing Sheets

(56) References Cited

U.S. PATENT DOCUMENTS

| | | |
|---|---|---|
| 2015/0146543 A1 | 5/2015 | Diener et al. |
| 2016/0029160 A1 | 1/2016 | Theurer et al. |
| 2017/0207897 A1 | 7/2017 | Kim et al. |
| 2018/0007516 A1 | 1/2018 | Ge et al. |
| 2018/0007651 A1 | 1/2018 | Vamaraju |
| 2018/0332493 A1 | 11/2018 | Bajko |
| 2019/0182693 A1* | 6/2019 | Zhang .................. H04W 76/27 |
| 2020/0077347 A1 | 3/2020 | Desai et al. |
| 2020/0162889 A1 | 5/2020 | Desai et al. |

OTHER PUBLICATIONS

Cisco, Configuring CCX Radio Management Features, www.cisco.com, downloaded Oct. 15, 2020, 6 pages.

* cited by examiner

ADAPTIVE BEACON REPORT FOR CLIENT DEVICES

RELATED APPLICATION

This application is a continuation of U.S. patent application Ser. No. 17/167,733 filed Feb. 4, 2021, the disclosure of which is incorporated herein by reference in its entirety.

TECHNICAL FIELD

The present disclosure relates generally to optimizing communications in a wireless network.

BACKGROUND

Institute of Electrical and Electronics Engineers (IEEE) 802.11 is part of the IEEE 802 local area network (LAN) protocols. IEEE 802 describes how client devices (CDs) are to roam in a wireless network when a CD gets out of range of one Access Point (AP) and attempts to associate with a new AP. A goal of IEEE 802.11k is to reduce an amount of time spent roaming by a CD between APs and thereby attempt to minimize the impact of roaming on performance. The IEEE 802.11k protocol provides mechanisms for APs and CDs to measure available radio resources and includes neighbor reporting, beacon reporting, and link measurement reporting.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Network Side Beacon Reports (NSBRs) may be generated based on probe signals received from one or more Client Devices (CDs) in a wireless network. Once initiated, an NSBR mode may be configured to generate NSBRs remotely from a CD. When in the NSBR mode, an NSBR may be generated based on compiled probe signal parameters associated with one or more probe signals received from the CD.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Under Institute for Electrical Engineers (IEEE) 802.11k, beacon reports may be generated by Client Devices (CDs) as each CD scans channels for a defined duration followed by transmission of a measurement or beacon report to one or more Access Points (APs). One scan type under IEEE 802.11k enables an active beacon measurement mode where a CD sends a probe request to a broadcast destination address on all supported channels, sets a measurement duration timer, and compiles all received beacons or probe responses from one or more APs into a beacon report after the measurement duration.

A beacon measurement is a type of radio resource measurement that informs a CD of what APs are within range of the CD. Conventionally, an AP transmits a request to CDs for a beacon measurement. In response to the beacon measurement request from the AP, each supporting CD may send a beacon report to the requesting AP. A beacon measurement request can optionally provide detailed instructions, such as available channels, a measurement duration, Service Set Identifier (SSID), Basic Service Set Identifier (BSSID), etc.

However, having CDs scan channels and generate beacon reports requires potentially disrupting on-demand measurements to scan channels and measure the wireless space around the CD in order to generate beacon reports. Unnecessary scanning operations performed by a CD may be time consuming, energy inefficient, and potentially detrimental to performance, particularly for CDs executing latency-sensitive applications. For example, a CD engaged in an active voice session may observe packet losses and/or reduced Quality of Service (QoS) when attempting to respond to a beacon report request that includes scanning for potentially hundreds of milliseconds (ms) to measure beacons on on-channel and/or off-channel frequencies in order to generate a client-based beacon report. Additionally, CDs that are not configured for IEEE 802.11k operation may not be equipped with the capability to provide beacon reports.

The present disclosure provides a Network Side Beacon Report (NSBR) mode that generates NSBRs based on probe signals received from CDs in a wireless environment. As described below, NSBRs may be used to quantify an operational state of the wireless environment and/or to generate control signals and/or operational suggestions to CDs that may improve or maintain a QoS, improve battery life, reduce packet losses, etc. As described below, an NSBR may be analyzed to ascertain operational information of the wireless environment for a particular CD which may include roaming and/or scanning trends of the CD.

Figure 1:
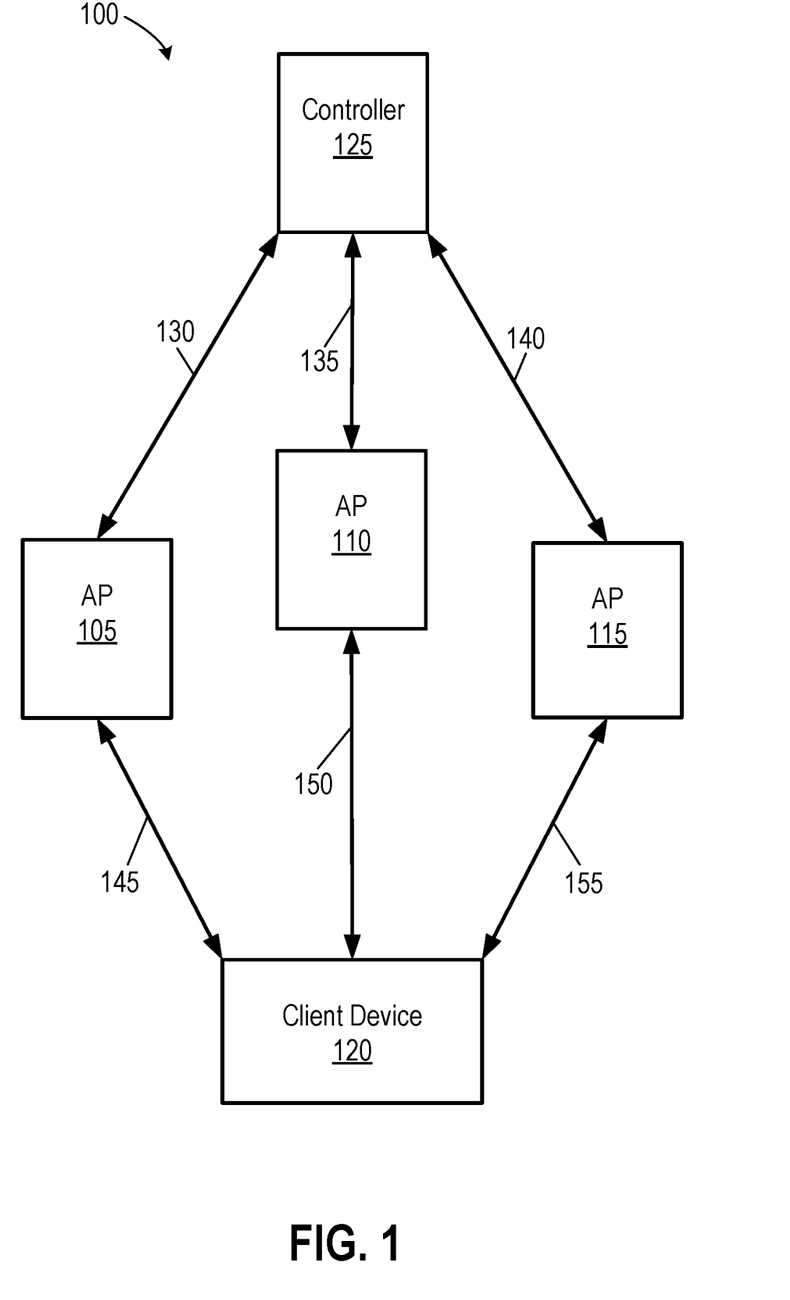
FIG. 1 is a block diagram of wireless network.

FIG. 1 shows a block diagram of an exemplary wireless network 100 for enabling an NSBR mode for generating NSBRs. As shown in FIG. 1, an exemplary wireless network 100 includes a first AP 105, a second AP 110, a third AP 115, a CD 120, and a controller 125. Each AP may be a networking hardware device that enables other devices, such as CD 120, to connect to wireless network 100. Controller 125 is in communication with AP 105 via communication link 130 (e.g., wired and/or wireless links). Controller 125 is in communication with AP 110 via communication link 135

(e.g., wired and/or wireless links). Controller 125 is also in communication with AP 115 via communication link 140 (e.g., wired and/or wireless links). Controller 125 may be provisioned as a master AP, a cloud-based device, a separate device, and/or otherwise configured.

As shown for the example of FIG. 1, AP 105 is in communication with CD 120 via wireless communication link 145, AP 110 is in communication with CD 120 via wireless communication link 150, and AP 115 is in communication with CD 120 via wireless communication link 155. AP 105, AP 110, AP 115, and CD 120 each include a radio communication system including radios and antennas configured to transmit and receive wireless signals transmitted in wireless network 100 via the respective communication links. AP 105, AP 110, AP 115, and CD 120 may use the respective radio communication systems to establish communication over wireless network 100 (e.g., a Wireless Local Area Network (WLAN)). For example, CD 120 may currently be associated with AP 110, where AP 105 and AP 115 are neighboring APs. While three APs and one CD are shown in FIG. 1, the disclosure is not so limited and may include additional or fewer APs, additional CDs, and/or other network infrastructure.

As described below, according to aspects of the disclosure, probe signal parameters from AP neighbors or other APs that have received probe signals from CD 120 (e.g., APs in a local site) may be used to generate an NSBR. In some cases, controller 125 may compile an NSBR for CD 120 each time an AP receives a probe signal from CD 120. In other cases, controller 125 may generate an NSBR for CD 120 at select times such as after a defined duration that encompasses multiple probe signals received from CD 120 for example. In some aspects, an AP that receives probe signals from a CD may generate an NSBR and forward to controller 125. Controller 125 may store generated NSBRs for CDs, including CD 120, in a database or memory data structure associated with wireless network 100.

Controller 125 may also delete NSBRs from the database or memory data structure after a certain time (e.g., after x minutes, hourly, daily, etc.) and/or as CDs roam away from wireless network 100. For example, once a probe signal collection duration expires, controller 125 may delete a previously compiled NSBR which may be replaced by a new NSBR. As an example, an NSBR for CD 120 may include probe signal parameters associated with multiple probe signals received from CD 120 over some duration (e.g., compile probe signals every x ms) or may be limited to a certain number of probe signals that have been received (e.g., the last 3 probe signals).

As described above, in some aspects, controller 125, an AP, or some other device may be used to initiate the NSBR mode. For example, controller 125 may initiate the NSBR mode when, according to capability parameters of CD 120, CD 120 is incapable of generating a beacon report. As another example, controller 125 may initiate the NSBR mode when CD 120 is running or preparing to run an application where generating a beacon report would be detrimental to the operation of the application. As one implementation example, CD 120 may be running a latency-sensitive application where it may be detrimental to pause application operations in order to scan channels and generate a beacon report by CD 120. Therefore, it may be beneficial to have the network side generate an NSBR for CD 120 based on one or more probe signals received from CD 120 so that CD 120 may continue to execute an on-going application without interruption.

As CD 120 actively probes the wireless network 100, one or more of AP 105, AP 110, and 115 may receive a probe signal (e.g., a probe frame) from CD 120. Once the NSBR mode is initiated, controller 125 or one or more of AP 105, AP 110, and AP 115 may begin to compile probe signal parameters associated with probe signals sent by CD 120. Controller 125, one or more of AP 105, AP 110, and AP 115, or a different network device may use NSBRs to obtain additional information about an operational state of a wireless environment by observing where and/or when probe signals are received as well as obtaining estimates of Downlink (DL) Received Signal Strength Indicators (RSSIs) based on received probe signals from CDs.

Using the additional information provided via an NSBR, the controller 125, one or more may APs, or some other device may be able to assist CD 120 to adjust roaming and/or scanning operations and thereby decrease time spent quantifying the wireless environment by CD 120 and improve or maintain a QoS for applications running on CD 120. Since NSBRs are generated on the network side, CD 120 may be able to ignore beacon report requests from APs (or APs may simply not send beacon report requests to CD 120 when NSBR mode is initiated) and/or CD 120 may spend less time scanning wireless network 100 allowing more time and bandwidth to be dedicated to crucial data communications and/or other tasks. Additionally, using the network side to generate NSBRs may potentially reduce an amount of power consumed by CD 120 which may result in extended battery life and/or energy savings due to a reduced amount of scanning required by for CD 120.

In certain aspects, controller 125 may analyze one or more parameters of an NSBR for CD 120 (e.g., a Voice-Over-Internet-Protocol (VOIP) device) to: observe roaming patterns including using a DL RSSI generated on the network side to quantify roaming trends for CD 120; quantify DL RSSI trends and/or other operational trends according to received probe signals from CD 120; determine how often CD 120 spends probing the wireless network 100; analyze computed Uplink (UL) RSSI values of received probe signals and/or the NSBR for CD 120 at various times or intervals to determine a QOS for mobility patterns and/or where reduced performance occurs for CD 120; determine when a final roaming scan occurs before CD 120 roams away from an associated AP (e.g., AP 110); etc.

Controller 125, an AP, or some other device may be able to analyze trends of probe signal transmissions and/or durations between probe signal transmissions to provide an indication or suggestion to CD 120 of a defined time or time interval of when to perform a roaming scan. As an example, information compiled from one or more client generated beacon reports may be compared with information of one or more NSBRs to quantify an amount of variance in the DL RSSI estimations as compared to actual signal information seen at one or more CDs (e.g., actual DL RSSI values seen at the CDs). The observed variance may be used as a factor to improve accuracy of future DL RSSI estimations. CD 120 is free to ignore a network side suggestion, such as when CD 120 is experiencing a rapidly declining DL RSSI for example, and may prefer to start a roaming scan as soon as possible or practicable.

As described above, compiled probe signal parameters may be used by the controller 125, a Master AP, or another device to generate an NSBR that is associated with CD 120. Controller 125 may generate NSBRs for additional CDs that may or may not be associated with wireless network 100. NSBRs may be shared with other controllers, neighbor APs, CD 120, etc. In an aspect, a serving AP serving CD 120 may share an NSBR, or certain parameters of the NSBR, with one or more neighbor APs as part of synchronizing a group of neighbor APs to report probing information received from CD 120 to controller 125 or the serving AP. For example, each AP may compile received probe signal parameters and generate an NSBR which can be transmitted or shared with controller 125 for use across a group of APs (e.g., a local site) or with the serving AP. An NSBR may be generated or updated for CD 120 based on each received probe signal, at desired times to include a collection of probe signal parameters for a plurality of received probe signals, and/or after a certain probe collection duration.

Controller 125 or one or more of AP 105, AP 110, and AP 115 may use the NSBR to generate commands to CD 120 and/or adjust operational aspects of wireless network 100. According to an aspect, one or more of AP 105, AP 110, and AP 115 may transmit a probe signal response frame to CD 120 that includes a trigger (e.g., a message) for initiating a roaming scan according to the NSBR. For example, one or more of AP 105, AP 110, and AP 115 may transmit a probe signal response frame to CD 120 that includes a message for CD 120 to initiate a roaming scan when CD 120 reaches or is in some defined proximity to a network edge. As another example, in response to a probe signal received from CD 120, one or more of AP 105, AP 110, and AP 115 may transmit a probe signal response frame to CD 120 that includes a suggested timing adjustment for initiating a roaming scan by CD 120 according to parameters of an NSBR for CD 120, so that CD 120 may adjust, delay, or prioritize the start of roaming scan.

According to an aspect, controller 125 or one or more of AP 105, AP 110, and AP 115 may adaptively switch from an NSBR mode to a client-based beacon report mode (e.g., legacy mode) (or vice versa). For example, operational parameters may be used to trigger an adaptive change from one compilation mode to another. According to an aspect, an Application Visibility Control parameter, a User Priority parameter, and a Session Profile parameter may be used to trigger switching between compilation modes.

The Application Visibility Control parameter may be used to account for the types of stations that are currently associated in the wireless network 100. The User Priority parameter accounts for the priority of data traffic in the network. Priority is based on data access categories (e.g., video, voice, best effort, background, etc.) that indicate a criticality of a station's (e.g., AP or CD) need to access a channel to transmit that data to prevent jitter and latency. For example, voice may be given the highest priority followed by video, best effort, and background, respectively. To account for the priority of data traffic in the network, a number of frames having a priority of at least x (e.g., at least video) in the last t seconds are determined. If the determined number of frames is above a threshold or predefined value, the compilation mode may be adaptively switched from a client-based beacon report mode to an NSBR mode. The Session Profile parameter may be used to account for a session profile of each CD differentiated by BSSID, which may include accounting for operational conditions when using the client-based beacon report mode versus the NSBR mode (e.g., selecting the mode that is more advantageous for the BSS at a particular time).

In other embodiments of the disclosure, rather than APs, devices may be used that may be connected to a cellular network that may communicate directly and wirelessly with end use devices to provide access to wireless network 100 (e.g., Internet access). For example, these devices may comprise, but are not limited to, eNodeBs (eNBs) or gNodeBs (gNBs). A cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

CD 120 may comprise any type of device capable of roaming and transmitting probe signals such as, but is not limited to, a laptop computer, a tablet computer, a smart phone, wearable computing device, an Internet-of-Things (IoTs) device, among other devices capable of accessing and using network 100 via one or more APs.

Components of wireless network 100 may be practiced in hardware and/or in software (including firmware, resident software, micro-code, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements, radio elements, or microprocessors. Furthermore, the components of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 4, aspects of wireless network 100 may be practiced in a computing device 400.

Figure 2:
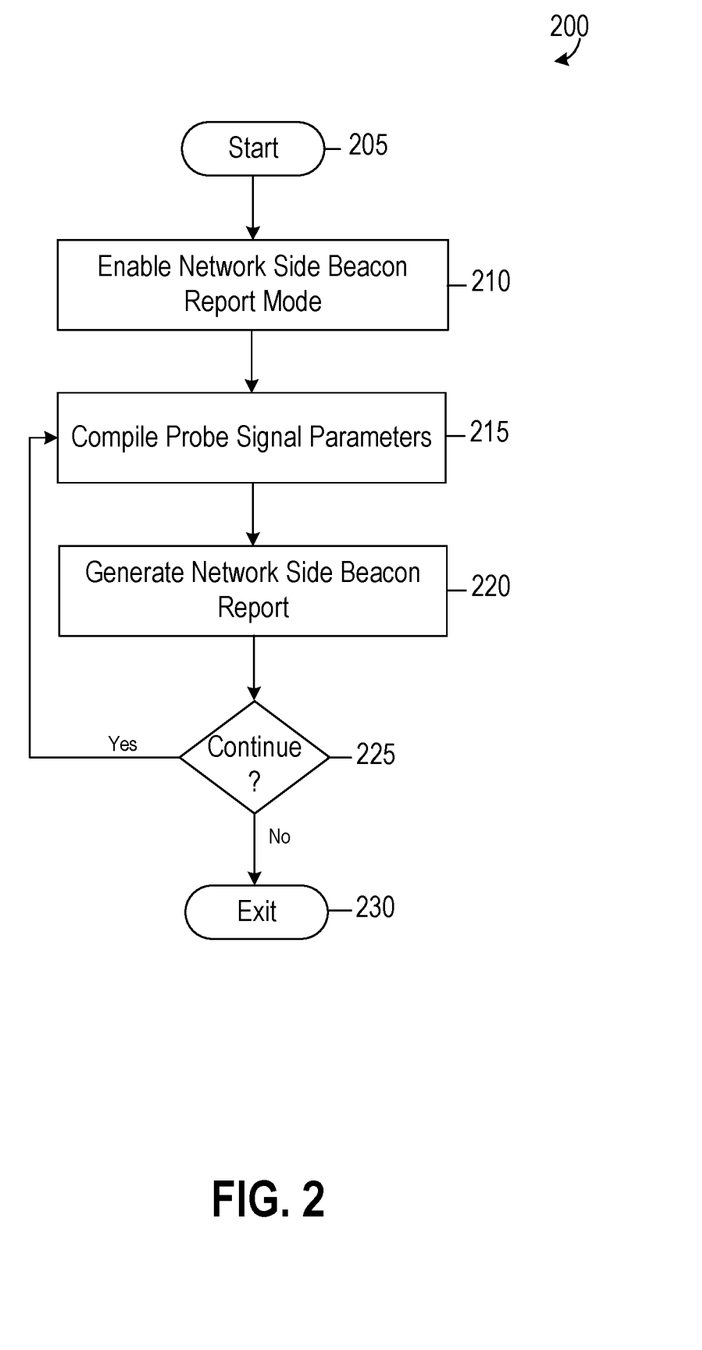
FIG. 2 is a flow chart of a method for generating a Network Side Beacon Report (NSBR) based on received probe signals.

FIG. 2 is a flow chart setting forth the general stages involved in a method 200 for generating an NSBR based on probe signals received from CD 120 and/or other CDs. Method 200 may be executed in a wireless environment (e.g., wireless network 100) that includes one or more APs and one or more CDs. As described above, conventionally in IEEE 802.11k, beacon reports are compiled by a CD (e.g., CD 120) that receives a beacon report request from one or more APs (e.g., AP 105, AP 110, AP 115). In contrast to beacon report generation by CDs, method 200 may be used as part of a system that includes controller 125, one or more APs (e.g., AP 105, AP 110, AP 115), and CD 120 operating as part of wireless network 100 to enable use of received client probe signals to compile a measurement or beacon report on the network side remotely from CD 120. Method 200 may be implemented using computing device 400 (e.g., controller 125, AP 105, AP 110, or AP 115) as described in more detail below with respect to FIG. 4. Ways to implement the stages of method 200 will be described in greater detail below.

Method 200 begins at block 205 and proceeds to stage 210 where method 200 enables an NSBR mode to generate an NSBR for CD 120 based on probe signals received by one or more APs (e.g., AP 105, AP 110, AP 115) from CD 120. Controller 125 and/or one or more of AP 105, AP 110, and AP 115 may be configured to enable the NSBR mode which results in compiling unicast, multicast, or broadcast probe signals transmitted from CD 120 and received by one or more of AP 105, AP 110, and AP 115 to generate an NSBR or measurement report remotely from CD 120.

As an example, the NSBR mode may be enabled in cases where APs and CDs may or may not be IEEE 802.11k compliant. For example, in addition to other NSBR mode triggering events described herein, controller 125 or an AP that CD 120 is currently associated with (e.g., AP 110) may be used to initiate the NSBR mode when CD 120 is not 802.11k compliant. Other example NSBR mode triggering events may include a determination that it would be detrimental on the performance of CD 120 to generate a beacon report or the CD 120 otherwise cannot currently generate a beacon report, as described in more detail below.

Once the NSBR mode is enabled, as part of initiating a roaming scan, CD 120 may transmit probe signals (e.g., unicast, multicast, or broadcast) over one or more of the wireless links (145, 150, 155) using one or more channels available on AP 105, AP 110, and AP 115 as part of determining whether to roam to a new AP, wherein the probe signal parameters associated with received probe signals may be compiled and used to generate a beacon report remotely from CD 120.

As one implementation example, method 200 may rely on controller 125 to enable the NSBR mode when CD 120 is unable to generate a beacon report or when it would be detrimental on the performance of CD 120 to generate a beacon report. For example, method 200 may use controller 125 to adaptively switch from a client-based beacon report generation mode (e.g., the IEEE 802.11k standard) to the NSBR mode for CD 120 depending on a threshold Quality of Service (QoS) required for CD 120, a client device type of CD 120, an application type running or queued to run on CD 120, capabilities of CD 120, previously compiled NSBRs for CD 120, probe signal trends for CD 120, RSSI trends associated with CD 120, a current operational state of wireless network 100, etc. Once in NSBR mode, one or more APs may discontinue requesting beacon reports until the NSBR mode is finished which may result in fewer beacon report request transmissions and corresponding reduced traffic and/or overhead in wireless network 100.

At stage 215, method 200 compiles probe signal parameters from probe signals transmitted by CD 120. For example, probe signals transmitted from CD 120 may be compiled by controller 125 after being received by one or more of AP 105, AP 110, and AP 115 as part of scheduled or adaptive probing operations of the operational environment by CD 120. Method 200 may compile probe signal parameters for each probe signal transmitted by CD 120 or aggregate probe signal parameters associated with a plurality of probe signals transmitted by CD 120 after a defined time or a defined time duration for example.

At stage 220, method 200 generates an NSBR based on the compiled probe signal parameters for CD 120. Method 200 may use controller 125 to generate an NSBR for CD 120 or rely on one or more APs to generate an NSBR for CD 120. As one example implementation, AP 110 that CD 120 is currently associated with may generate an NSBR for CD 120 based on probe signals received by AP 105 and AP 115 from CD 120 that are shared with AP 110. For example, AP 105 and AP 115 may share probe signal parameters of received probe signals from CD 120 with AP 110 for compiling by AP 110 into an NSBR for CD 120. Additionally or alternatively, AP 105 and AP 115 may pass the compiled probe parameters to controller 125 for generating the NSBR for CD 120.

In various aspects, method 200 may generate an NSBR to include a time that each probe signal was received by a corresponding AP, an UL RSSI of each probe signal, and/or a derived or estimated DL RSSI for each probe signal, an Identifier (ID) of CD 120, etc. As an example, each NSBR may be generated to include a DL RSSI derived from an UL RSSI for a probe signal received at each AP according to a signal strength of the received probe signal from CD 120. For example, each AP may compute an UL RSSI value to estimate a DL RSSI value for the CD 120 (e.g., Transmitter Power Output (TPO)+Transmitter Gain−Path Loss+Receiver Gain=Estimated DL RSSI or TPO+UL RSSI=Estimated DL RSSI) according to each probe signal received from CD 120. In certain aspects, a probe frame for a probe signal may include an embedded Link Measurement Information Element (IE) carrying a power element (e.g., TPO parameter) for CD 120 that may be used for DL RSSI estimation for CD 120 to include in an NSBR. Parameters of the NSBR including the DL RSSI may provide the network side with an assessment of the health of CD 120 as well as what radio environment CD 120 perceives for a given time or duration in wireless network 100. Accordingly, the network side may use the NSBR as a probe signal profile for CD 120 as part of assessing the radio environment of CD 120 including roaming and/or scanning trends of CD 120.

For example, rather than CD 120 compiling a beacon report as is conventionally performed, method 200 may enable the NSBR mode to allow controller 125 to generate an NSBR for CD 120 based on probe signal parameters of one or more probe signals transmitted by CD 120, wherein the NSBR may include an estimated DL RSSI value associated with a received probe signal from CD 120, a time when the probe signal was received, a CD identifier (e.g., Media Access Control (MAC) address), etc. As described above, controller 125 and/or each AP may determine or estimate the DL RSSI for CD 120 based in part on the UL RSSI and/or an optional power element of a received probe signal at a corresponding endpoint.

In some aspects, method 200 may utilize each AP to compile probe signal parameters as received from CD 120 and/or generate an NSBR locally at the respective AP. Thereafter, each AP may share compiled probe signal parameters and/or NSBRs with other APs and/or controller 125 for generating a complete NSBR or probe signal profile for CD 120. For example, method 200 may utilize controller 125 to compile the collected probe signal parameters from one or more of AP 105, AP 110, and AP 115 received from CD 120 into an NSBR that may include a plurality of estimated DL RSSI values of CD 120 based on UL RSSI computed at each AP and which may be representative of a probe signal profile for CD 120.

As described above, in some aspects, method 200 may rely on controller 125 to compile an NSBR for CD 120 according to neighbor reporting of probe signals received by one or more APs from CD 120. For example, assuming that CD 120 is associated with AP 110, AP 110 may provide a neighbor list that identifies AP 105 and AP 115 and channels on which they are respectively operating for CD 120 to use when scanning, and as part of subsequent scanning operations, CD 120 transmits probe signals to AP 105 and AP 115 that may include an optional power element that may be used in determining a DL RSSI based on the UL RSSI associated with each probe signal received by each of AP 105 and AP 115.

Continuing the example, AP 105 and AP 115 may in turn share the probe signal parameters associated with the received probe signals from CD 120 to AP 110 or controller 125 for use in generating one or more NSBRs for CD 120 which may include deriving the DL RSSI from the UL RSSI and/or optional power element. Controller 125 may then send the NSBR to AP 110 to use as part of providing a hint/suggestion as to which AP CD 120 may prefer to roam to.

If method 200 is to continue by updating the NSBR as new probe signals are received or generate a new NSBR for CD 120 at decision 225, then method 200 returns to 215. For example, method 200 may return to 215 if a compilation time to control a probe signal collection duration to generate a new NSBR or update an existing NSBR for CD 120 has not yet expired. Otherwise, method 200 exits at 230. For example, method 200 may exit at 230 if CD 120 has roamed away from wireless network 100 or if method 200 adaptively resumes client-based beacon reporting or a different operational mode of operation of CD 120.

As an implementation example, CD 120 may be a VOIP device and method 200 may be utilized in a VOIP environment to control an adaptive switch from client-based beacon report generation to an NSBR mode for the VOIP device based on a user policy or profile, application type, QoS statistics, prior NSBRs or compiled probe profiles, etc. For example, based on the VOIP device being actively engaged in a voice session or having a historical primary traffic classification of voice data, method 200 may utilize controller 125 to send a control signal to a single AP (e.g., AP 110 currently associated with VOIP device) or one or more APs of a group of APs (e.g., AP 105, AP 110, and AP 115) to indicate switching from a client-based beacon report generation mode to the NSBR mode so that probe signal parameters of probe signals transmitted by the VOIP device are provided to controller 125 for compilation and generation of an NSBR for the VOIP device. Depending on its capabilities and/or operational mode, the VOIP device may operate to unicast, multicast, or broadcast probe signals to one or more APs. As described above, once NSBR mode is enabled, an AP may discontinue transmission of beacon report request frames to clients which may result in a reduction in channel traffic and/or overhead associated with wireless network 100.

As further example of method 200, an associated AP (e.g., AP 110) may initiate the NSBR mode with the VOIP device and any APs receiving probe signals from the VOIP device (within a Basic Service Set (SSID) or Extended SSID for example) may contribute probe signal parameters for compiling and generating an NSBR for the VOIP device. For example, neighbor APs (e.g., AP 105 and AP 115) may share probe signal parameters with AP 110 so that AP 110 may generate an NSBR for the VOIP device or AP 110 may compile and forward probe signal parameters to controller 125 to generate the NSBR for the VOIP device.

As an additional example, controller 125 may, in real-time or near real-time, inform associated AP 110 to switch to an adaptive probe-based beacon report mode (e.g., NSBR mode) based on a number of active frames in a voice queue for some defined duration (e.g., last x ms) since the VOIP device may be unable to respond to a beacon report request when engaged in an active voice session, multimedia session, or some other application that requires high quality downlink and uplink communications. As another example, controller 125 may inform associated AP 110 to switch to the NSBR mode based on QoS requirements of the VOIP device as a desired QoS falls below a QoS threshold according to QoS statistics of the VOIP device.

Figure 3:
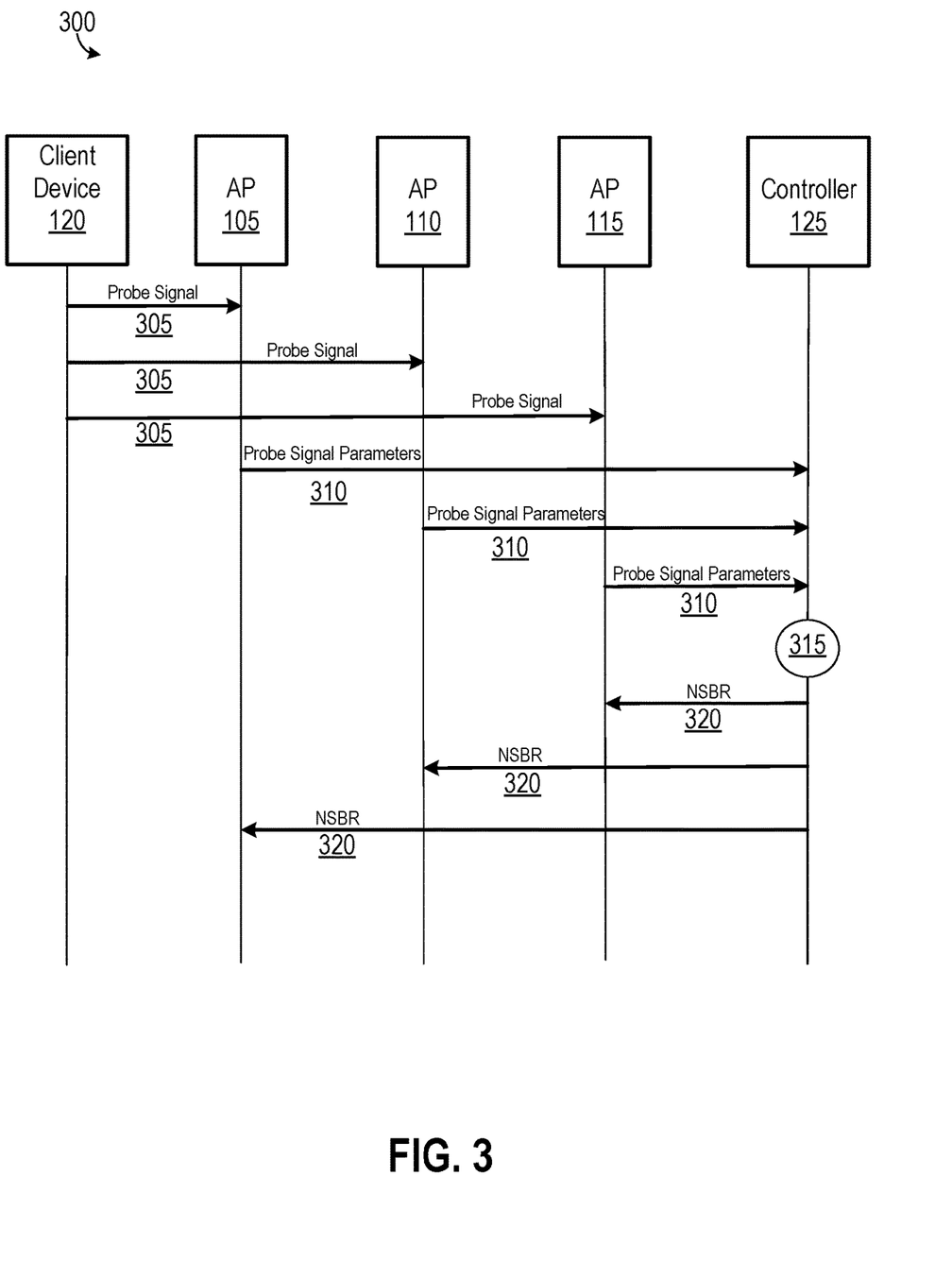
FIG. 3 is a diagram of a method for generating an NSBR based on received probe signals.

FIG. 3 is a diagram of a method 300 for generating an NSBR by controller 125 based on broadcast probe signals received by AP 105, AP 110, and AP 115 from CD 120. FIG. 3 depicts an example where the NSBR mode has been initiated by controller 125. For example, controller 125 may have initiated the NSBR mode based on CD 120 being actively engaged in a voice session. At 305, AP 105 receives a probe signal from CD 120, AP 110 receives a probe signal from CD 120, and AP 115 receives a probe signal from CD 120 based on the broadcast probe signal transmission.

At 310, AP 105 transmits probe signal parameters associated with the probe signal received from CD 120 to controller 125, AP 110 transmits probe signal parameters associated with the probe signal received from CD 120 to controller 125, and AP 115 transmits probe signal parameters associated with the probe signal received from CD 120 to controller 125. For example, each AP may transmit at least one UL RSSI value, and optionally, an estimated DL RSSI value based on a received probe signal to controller 125. As described above, each AP may compile its own NSBR and have controller 125 compile each NSBR into a complete NSBR for CD 120. At 315, controller 125 compiles the probe signal parameters provided by AP 105, AP 110, and AP 115 to generate the NSBR. At 320, controller 125 may transmit the NSBR to one or more of AP 105, AP 110, and AP 115. As probe signals are received by AP 105, AP 110, and/or AP 115 from CD 120, the method 300 of FIG. 3 may be used to update the NSBR with additional probe signal parameters or create a new NSBR for CD 120. Method 300 conceptually illustrates one example embodiment. In other embodiments, as previously discussed, one or more of the APs may share the probe signal parameters and/or reports compiled by the respective APs based on the probe signal parameters among each other (e.g., without involving controller 125).

As an implementation example of FIG. 3 for a VOIP device, once the NSBR mode is enabled, controller 125 may compile probe signal parameters received by one or more APs from the VOIP device to generate an NSBR for the VOIP device as the user moves about some location (e.g., a local site). As described above, requesting the VOIP device to prepare a beacon report in response to a beacon report request may be detrimental to the operation of the VOIP device due in part to an amount of time that may be required to scan channels and generate a client-based beacon report by the VOIP device according to IEEE 802.11k for example.

Accordingly, the NSBR mode may be used to enable controller 125 to generate an NSBR for the VOIP device based on probe signals received by one or more APs in the local site from the VOIP device. The NSBR generated by controller 125 may be used to assess an operational environment of the VOIP device as the user moves about the local site without adversely affecting device performance since the VOIP device may not be required to perform unnecessary scans of its radio environment. By using controller 125 to generate an NSBR for the VOIP device, the VOIP device may not be required to perform a scan as often (or at all) and the VOIP device may see reduced power consumption and improved battery life due in part to a reduction of scans or scan times as well as the processing involved in compiling a beacon report by the VOIP device. Additionally, by reducing scans or scan times, the VOIP device may be less susceptible to packet loss while performing unnecessary scans and thereby enable timely communication of voice data stream packets to maintain a desired QoS.

Figure 4:
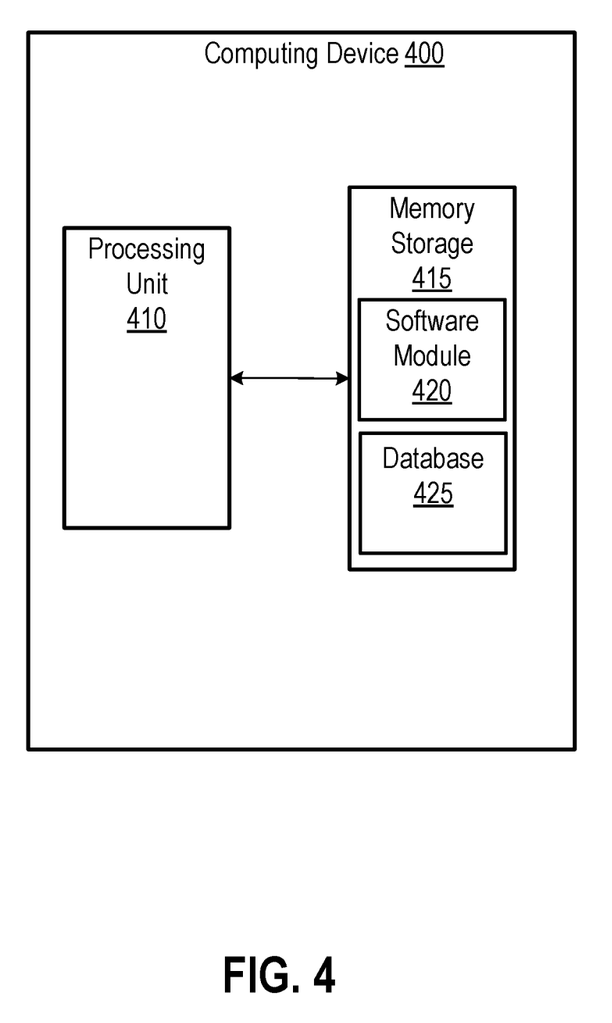
FIG. 4 is a block diagram of a computing device.

FIG. 4 shows computing device 400. As shown in FIG. 4, computing device 400 may include a processing unit 410 and a memory unit 415. Memory unit 415 may include a software module 420 and additional logic. While executing on processing unit 410, software module 420 may perform, for example, processes for generating an NSBR based on received client probe signals as described herein. Computing device 400, for example, may provide an operating environment for controller 125, AP 105, AP 110, AP 115, CD 120, etc. Other operational environments may be utilized, and the present disclosure is not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
a processing unit; and
memory storage that includes instructions which, when executed by the processing unit, causes the processing unit to:
  enable a Network Side Beacon Report (NSBR) mode to generate beacon reports remotely from a Client Device (CD); and
  when in the NSBR mode:
    compile probe signal parameters associated with one or more probe signals received at one or more Access Points (APs) from the CD; and
    generate an NSBR for the CD based on the probe signal parameters associated with the one or more probe signals received from the CD, wherein the processing unit is caused to enable the NSBR mode based on one or more of a threshold Quality of Service (QoS) parameter, a client device type, and an application type, and wherein the processing unit is further caused to determine an amount of variance between Downlink (DL) Received Signal Strength Indicator (RSSI) estimations for the CD and actual DL RSSI values.

2. The system of claim 1, wherein the processing unit is further caused to transmit a signal to the CD that includes a trigger for the CD to initiate a roaming scan according to the NSBR.

3. The system of claim 1, wherein the processing unit is further caused to share at least one or more parameters of the NSBR with the one or more APs.

4. The system of claim 1, wherein the processing unit is further caused to synchronize the one or more APs to report information received from the CD.

5. The system of claim 1, wherein the processing unit is further caused to:
determine an Uplink (UL) RSSI based on the probe signal parameters;
estimate a DL RSSI for the CD based on the UL RSSI; and
include the DL RSSI in the NSBR.

6. The system of claim 1, wherein the processing unit is further caused to adaptively switch from a client-based beacon report mode to the NSBR mode or from the NSBR mode to the client-based beacon report mode.

7. The system of claim 1, wherein the processing unit is further caused to trigger a change from a client-based beacon report mode to the NSBR mode or from the NSBR mode to the client-based beacon report mode based on at least one of an Application Visibility Control parameter, a User Priority parameter, and a Session Profile parameter.

8. A method comprising:
enabling a Network Side Beacon Report (NSBR) mode to generate beacon reports remotely from a Client Device (CD);
when in the NSBR mode:
compiling probe signal parameters associated with one or more probe signals received at one or more Access Points (APs) from the CD, and
generating an NSBR for the CD based on the probe signal parameters associated with the one or more probe signals received from the CD;
adaptively switching from a client-based beacon report mode to the NSBR mode or from the NSBR mode to the client-based beacon report mode; and
determining an amount of variance between Downlink (DL) Received Signal Strength Indicator (RSSI) estimations for the CD and actual DL RSSI values.

9. The method of claim 8, further comprising transmitting a signal to the CD that includes a trigger for the CD to initiate a roaming scan according to the NSBR.

10. The method of claim 8, further comprising sharing at least one or more parameters of the NSBR with the one or more APs.

11. The method of claim 8, further comprising synchronizing the one or more APs to report information received from the CD.

12. The method of claim 8, further comprising:
determining an Uplink (UL) RSSI based on the probe signal parameters;
estimating a DL RSSI for the CD based on the UL RSSI; and
including the DL RSSI in the NSBR.

13. The method of claim 8, further comprising enabling of the NSBR mode based on one or more of a threshold Quality of Service (QoS) parameter, a client device type, and an application type.

14. A non-transitory computer-readable medium that stores a set of instructions which when executed perform a method executed by the set of instructions comprising:
enabling a Network Side Beacon Report (NSBR) mode to generate beacon reports remotely from a Client Device (CD);
when in the NSBR mode:
compiling probe signal parameters associated with one or more probe signals received at one or more Access Points (APs) from the CD, and
generating an NSBR for the CD based on the probe signal parameters associated with the one or more probe signals received from the CD; and
triggering a change from a client-based beacon report mode to the NSBR mode or from the NSBR mode to the client-based beacon report mode based on at least one of an Application Visibility Control parameter, a User Priority parameter, and a Session Profile parameter; and
determining an amount of variance between Downlink (DL) Received Signal Strength Indicator (RSSI) estimations for the CD and actual DL RSSI values.

15. The non-transitory computer-readable medium of claim 14, further comprising:
determining an Uplink (UL) RSSI based on the probe signal parameters;
estimating a DL RSSI for the CD based on the UL RSSI; and
including the DL RSSI in the NSBR.

16. The non-transitory computer-readable medium of claim 14, further comprising enabling of the NSBR mode based on one or more of a threshold Quality of Service (QoS) parameter, a client device type, and an application type.

17. The non-transitory computer-readable medium of claim 14, further comprising synchronizing the one or more APs to report information received from the CD.

18. The non-transitory computer-readable medium of claim 14, further comprising sharing at least one or more parameters of the NSBR with the one or more APs.

19. The non-transitory computer-readable medium of claim 14, further comprising adaptively switching from a client-based beacon report mode to the NSBR mode or from the NSBR mode to the client-based beacon report mode.

20. The non-transitory computer-readable medium of claim 14, transmitting a signal to the CD that includes a trigger for the CD to initiate a roaming scan according to the NSBR.

* * * * *